(12) United States Patent
Alberth, Jr. et al.

(10) Patent No.: US 7,822,644 B2
(45) Date of Patent: Oct. 26, 2010

(54) METHODS AND DEVICES FOR ESTABLSHING AND PROCESSING PAYMENT RULES FOR MOBILE COMMERCE

(75) Inventors: William P. Alberth, Jr., Prairie Grove, IL (US); Louis J. Vannatta, Crystal Lake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1136 days.

(21) Appl. No.: 11/385,567

(22) Filed: Mar. 21, 2006

(65) Prior Publication Data

US 2007/0250393 A1   Oct. 25, 2007

(51) Int. Cl.
*G06Q 30/00* (2006.01)
(52) U.S. Cl. .............................. 705/26; 705/27; 705/40; 455/41.2; 455/414.1; 709/220
(58) Field of Classification Search .................. 705/26, 705/27, 40; 709/220; 455/41.2, 414
See application file for complete search history.

(56) References Cited

U.S. PATENT DOCUMENTS

| 2002/0065774 | A1 | 5/2002 | Young et al. |
| 2002/0086663 | A1* | 7/2002 | Tang et al. .................... 455/414 |
| 2005/0004875 | A1 | 1/2005 | Kontio et al. |
| 2005/0069137 | A1 | 3/2005 | Landrock |
| 2005/0071269 | A1* | 3/2005 | Peters .......................... 705/40 |
| 2005/0187873 | A1 | 8/2005 | Labrou et al. |
| 2005/0222961 | A1 | 10/2005 | Staib et al. |
| 2006/0234631 | A1* | 10/2006 | Dieguez ..................... 455/41.2 |
| 2007/0030824 | A1* | 2/2007 | Ribaudo et al. ............. 370/328 |

\* cited by examiner

*Primary Examiner*—Yogesh C Garg

(57) ABSTRACT

Disclosed are methods and devices for automatically selecting which mobile communication device among two or more related mobile communication devices may establish communication or authorize a transaction for particular services or goods with an unrelated third communication device. The described method includes a first mobile communication device detecting the presence of a related second mobile communication device and authorizing a communication with a third unrelated entity, such as that of a vendor, based on the presence of the related second mobile communication device. Also described is a method of a first mobile communication device including detecting the presence of a related second mobile communication device and restricting wireless communication with a unrelated third communication device, such as that of a vendor.

18 Claims, 3 Drawing Sheets

METHODS AND DEVICES FOR ESTABLSHING AND PROCESSING PAYMENT RULES FOR MOBILE COMMERCE

FIELD

Disclosed are methods and devices for mobile commerce and more particularly methods and devices for automatically selecting which mobile communication device among two or more related mobile communication devices may establish communication or authorize a transaction for particular services or goods with an unrelated third communication device.

BACKGROUND

The makers of mobile communication devices, including those of cellular telephones, are increasingly adding functionality to their devices. For example, cellular telephones include features such as still and video cameras, video streaming and two-way video calling, email functionality, Internet browsers, music players, FM radios with stereo audio, and organizers. Bluethooth enabled cellular telephones may be PC compatible so that files generated or captured on the mobile communication device may be downloaded to a PC. Likewise, data from a PC or other source may be uploaded to the mobile communication device. Cellular telephones in particular are becoming more than simply mobile communication devices. They are evolving into powerful tools for information management.

Mobile commerce (M-commerce) is yet another functionality being incorporated into the operations of mobile communication devices. Mobile commerce refers to transactions using a wireless device and data connection that result in the transfer of value in exchange for information, services, or goods. Near field protocols such as Bluetooth, radio frequency identification (RFID), personal area network (PAN), as well as Internet capabilities, can enable mobile communication devices such as cellular telephones and PDAs to carry out financial transactions. Mobile commerce, facilitated generally by mobile phones, can include services such as banking, payment, and ticketing. Accordingly, mobile communication devices may replace traditional wallets and credit cards. The emerging technology behind m-commerce may transform the mobile communication device into an electronic wallet.

In m-commerce, a mobile communication device may be used to facilitate a transaction between a vendor and a customer while in near field communication. For example, a mobile communication device within range of a vendor's payment station may request authorization for payment from the user and then process a payment to the vendor. On the other hand, certain payments may be pre-authorized. For example, a user may pass through a toll booth enabled to receive a payment via an m-commerce enabled mobile communication device. The toll booth may detect the presence of the m-commerce enabled mobile communication device and may therefore accept payment since the payment can be pre-authorized by the user. The user therefore may be free to pass through the toll booth and process a transaction without engaging in a manual transaction with the toll booth.

Two or more mobile communication devices may be within range of a vendor's payment station and may also provide for a pre-authorized payment to that particular vendor. In such a situation, one or more mobile communication devices therefore may authorize payment erroneously. It would be beneficial if there were rules between the devices that could govern communication such as transactions with a third entity such as the vendor based on the presence or proximity of another related mobile communication device.

SUMMARY

Disclosed are methods and devices for automatically selecting which mobile communication device among two or more related mobile communication devices may establish communication or authorize a transaction for particular services or goods with an unrelated third communication device. A described method includes a first mobile communication device detecting the presence of a related second mobile communication device and authorizing a communication with a third unrelated entity, such as that of a vendor, based on the presence of the related second mobile communication device. Also described is a method of a first mobile communication device including detecting the presence of a related second mobile communication device and restricting wireless communication with a unrelated third communication device, such as that of a vendor.

DETAILED DESCRIPTION

Figure 1:
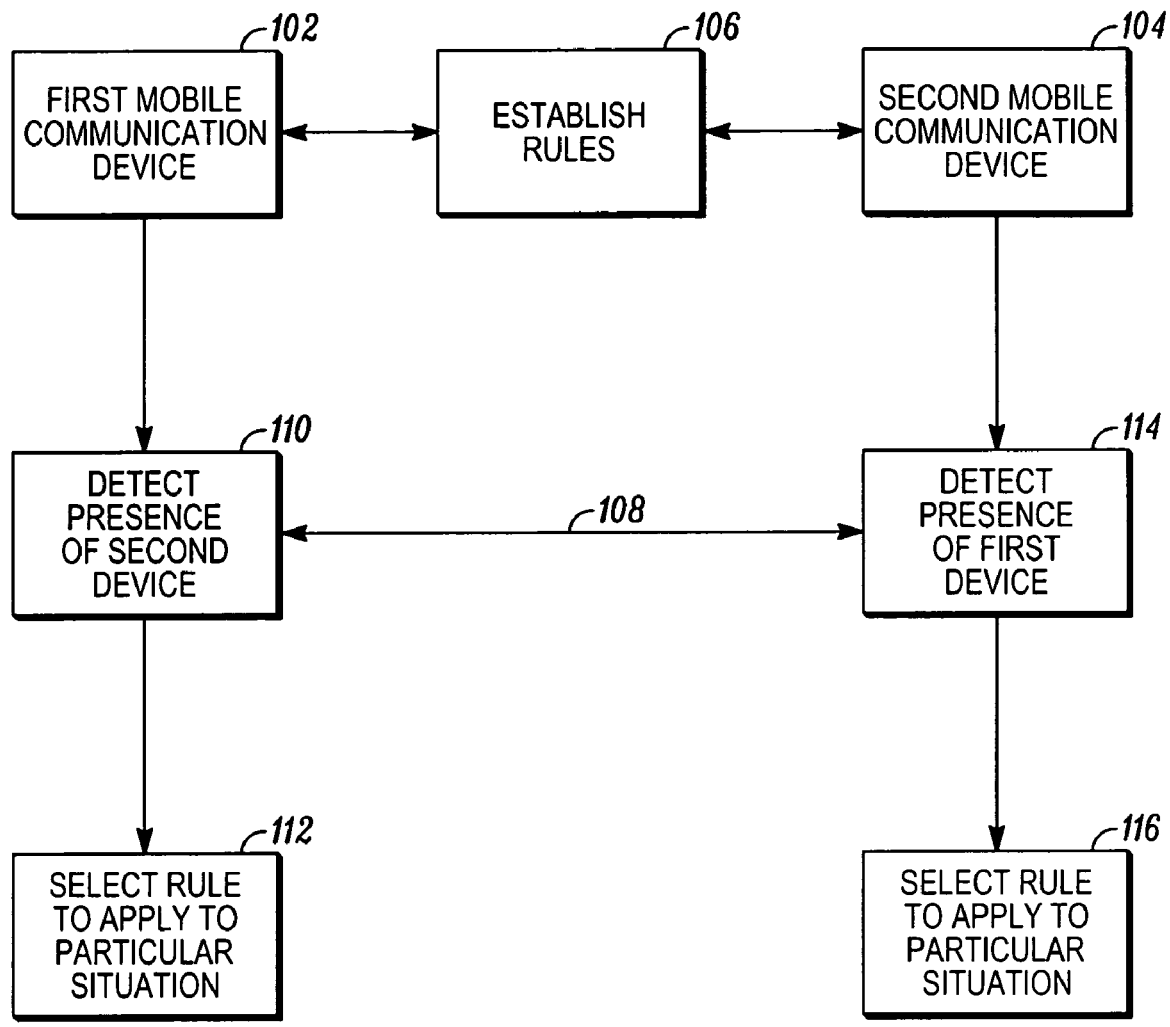
FIG. 1 is a flowchart of a first mobile communication device and a second mobile communication device as they establish rules between themselves.

Described is a method for automatically selecting which mobile communication device among a group of mobile communication devices may establish communication or authorize a transaction for particular services or goods with an unrelated third communication device such as a vendor station. The automatic selecting process may be based on user-programmed rules to be applied when multiple mobile communication devices are in the presence of each other and the unrelated third device. The rules between two or more mobile communication devices allow the devices to negotiate which device will communicate or carry out a transaction based on the group rules.

The described method includes a first mobile communication device detecting the presence of a related second mobile communication device and authorizing a communication with a third entity, such as that of a vendor, based on the presence of the related second mobile communication device. Also described is a method of a first mobile communication device including detecting the presence of a related second mobile communication device and restricting wireless communication with a non-related communication device, such as that of a vendor. A non-related device is also referred to as an unrelated device or third entity.

Further described is a mobile communication device including a detection module configured to detect the presence of a related second mobile communication device and a communication authorization module configured to authorize wireless communication with a non-related communication device, such as that of a vendor, based on rules regarding the presence of the related second mobile communication device.

Additionally disclosed is that the first and second mobile communication devices can be related by establishing at least one rule between the first device and the related second device based on their proximity to each other. A rule establishment module can be further configured to allow or restrict communication or a transaction with the non-related communication device, such as that of a vendor, based upon a transaction criterion.

Before describing in detail embodiments that are in accordance with the present disclosure, it should be observed that the embodiments reside primarily in combinations of method steps and components related to automatically selecting which mobile communication device among a group of mobile communication devices may establish communication or authorize a transaction for particular services or goods with an unrelated third communication device. Accordingly, the components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the disclosure described herein may be comprised of one or more conventional processors and unique stored program instructions that control the one or more processors to implement, in conjunction with certain non-processor circuits, some, most, or all of the functions of automatically selecting which mobile communication device among a group of mobile communication devices may establish communication or authorize a transaction for particular services or goods with an unrelated third communication device, as described herein.

The non-processor circuits may include, but are not limited to, a radio receiver, a radio transmitter, signal drivers, clock circuits, power source circuits, and user input devices. As such, these functions may be interpreted as steps of a method relating to automatically selecting which mobile communication device among a group of mobile communication devices may establish communication or authorize a transaction for particular services or goods with an unrelated third communication device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a flowchart of a first mobile communication device 102 and a second communication device 104 as they establish rules between themselves 106. The rules may include different characteristics including priorities, types of transactions, time of transactions, time between transactions, amount of transactions, when some or all of the rules can expire, time for payments, time between payments, which store, vendor or service may be paid, actions when in presence of other units, and the dollar amount for authorization. The rules may be adaptive and may provide the ability for the devices to change and/or learn according to the rules. It is understood that the foregoing list is not exhaustive and that any suitable rules may be applied as the devices establish rules between themselves 106.

The rules may be effected when devices 102 and 104 detect the presence of each other 108. Accordingly upon detection 110 of device 104, device 102 can select a rule or a plurality of rules to apply to the particular situation 112. Similarly, upon detection 114 of device 102, the second related device 104 can select a rule or a plurality of rules to apply to the particular situation 116.

Figure 2:
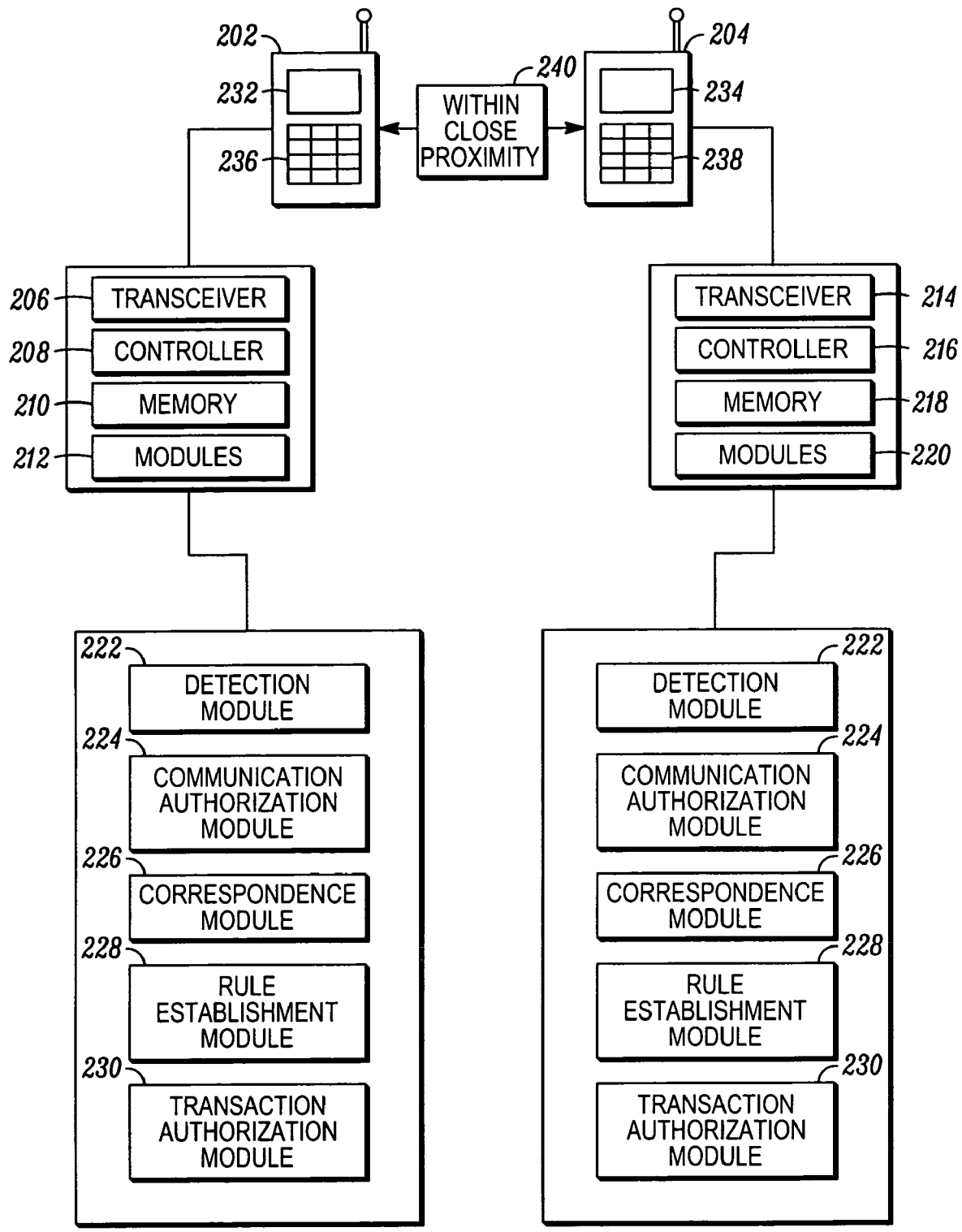
FIG. 2 depicts a first mobile communication device and a related mobile communication device.

FIG. 2 depicts a first mobile communication device 202 and a related mobile communication device 204. A wide variety of mobile communication devices that have been developed and will be developed for use within various networks are included in this discussion. Handheld communication devices include, for example, cellular telephones, messaging devices, mobile telephones, personal digital assistants (PDAs), notebook or laptop computers incorporating communication modems, mobile data terminals, application specific gaming devices, video gaming devices incorporating wireless modems, audio and music players and the like. It is understood that any mobile communication device is within the scope of this discussion.

The mobile communication device 202 depicted in FIG. 2 can include a transceiver 206, a processor or controller 208, memory 210, and modules 212. Likewise the related mobile communication device 204 can include transceiver 214, a processor or controller 216, memory 218, and modules 220. The mobile communication devices 202 and 204 are depicted with modules 212 and 220 respectively that can contain instruction modules that can be hardware and/or software to carry out various tasks. The modules can carry out certain processes of the methods as described herein. The modules can be implemented in software, such as in the form of one or more sets of prestored instructions, and/or hardware, which can facilitate the operation of the mobile communication device as discussed below. The modules may be installed at the factory or can be installed after distribution by, for example, a downloading operation. The operations in accordance with the modules will be discussed in more detail below.

The modules of the mobile communication devices 202 and 204 are illustrated as being similar. Of course, any other modules may be part of those devices. The first mobile communication device 202 can include a detection module 222, communication authorization module 224, correspondence module 226, rule establishment module 228 and transaction authorization module 230. Similarly shown for the related second mobile communication device 204 are a detection module 222, communication authorization module 224, correspondence module 226, rule establishment module 228 and transaction authorization module 230. Both mobile communication devices 202 and 204 are shown with display devices 232 and 234 and input devices 236 and 238. Likewise, other components are within the scope of this discussion.

Again, referring to FIG. 1 rules are established 106 between the devices 102 and 104. Now referring to FIG. 2, a correspondence module 226 may be configured to relate the mobile communication device 202 to the related second mobile communication device 204 by establishing at least one rule between the devices based on their proximity.

Figure 3:
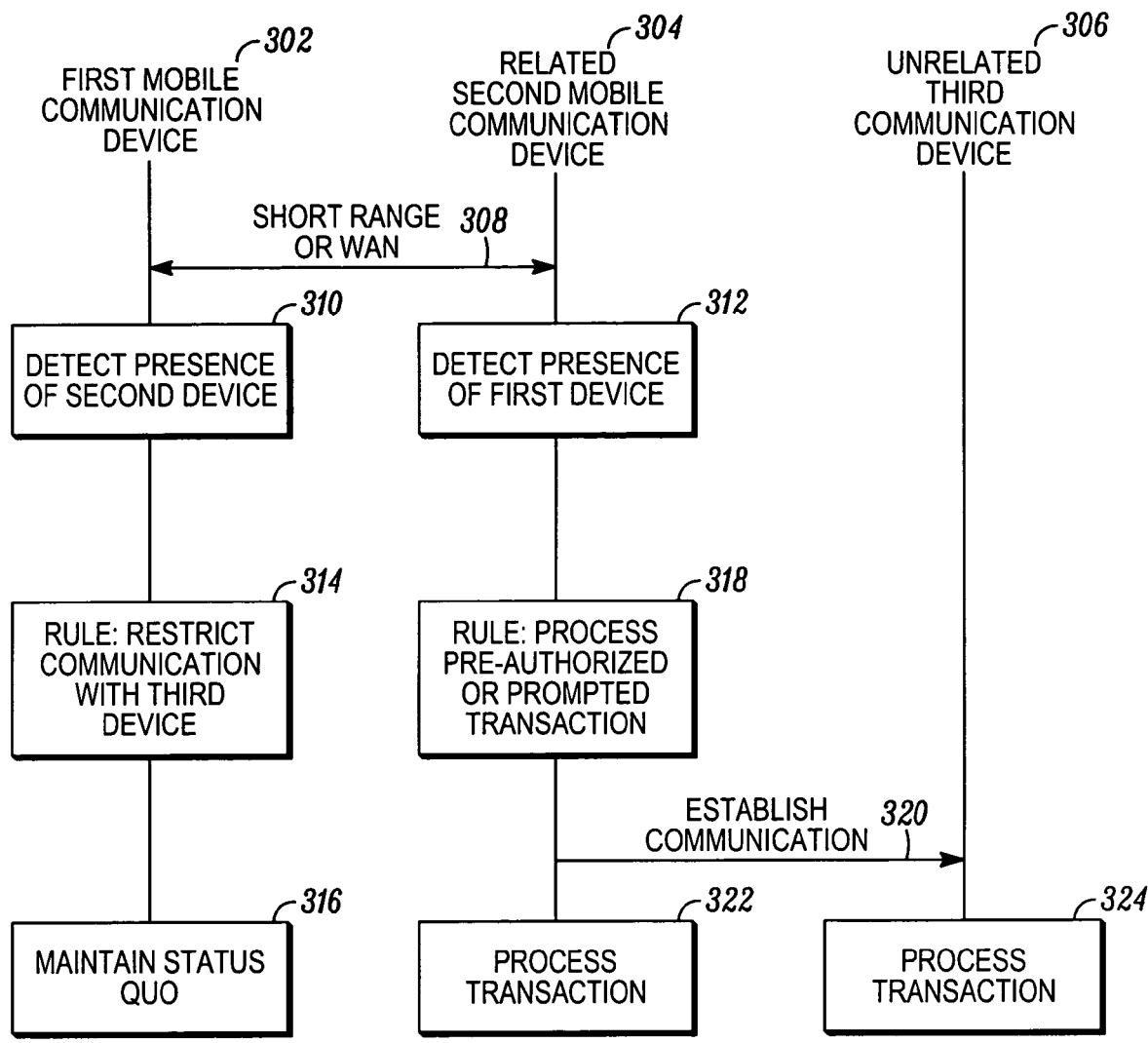
FIG. 3 is a signal flow diagram including a first mobile communication device, a related second mobile communication device and an unrelated third device.

Therefore, when the first device 202 detects the presence 240 of the second related device 204, or vice versa, the devices may negotiate according to the rules which of the devices may communicate or transact with an unrelated third device (see 306, FIG. 3). The communication module 224 may be configured to authorize wireless communication with a non-related communication device based on rules regarding the presence of a related second mobile communication device. Similarly, a rule establishment module 228 may be configured to allow or restrict communication and/or a transaction with the unrelated third communication device based upon a criterion or criteria. The rule establishment module 228 may be configured to establish at least one rule with the related second mobile communication device 204 to allow or restrict communication and/or a transaction with the unrelated third communication device based upon a criterion or criteria, such as the presence or proximity of the related second mobile communication device. Accordingly, the devices may negotiate which of the devices are restricted from communication with an unrelated third device. While FIG. 2 depicts two devices 202 and 204, it is understood that any number of related devices and any type of devices may be parties to the rules. As discussed above, the rules based upon the proximity of the devices may include any suitable characteristics to govern communication and/or transactions.

In one embodiment, for example, the two devices 204 and 206 are a PDA and a personal computer. The user may develop a calendar on either device, for example, on the PDA. The user may download the calendar to the personal computer. When the two devices are in proximity to one another, they can detect the presence of the other 240. The two devices may have rules (see 106, FIG. 1) between them so that when they detect the presence of each other 240, only one of the devices will provide a calendar alarm to an unrelated device or to the user. In this manner, one device is restricted from providing an alarm communication to another unrelated device or to the user. The user may benefit from receiving a single alarm instead of two alarms.

In another embodiment, for example, a user may possess two mobile communication devices such as two cellular telephones 202 and 204. When the two devices are in proximity to one another, they can detect the presence of the other 240. The two devices may have rules (see 106, FIG. 1) between them so that when they detect the presence of each other 240, only one of the devices may be engaged in communication with a network server for example. Accordingly, if one or the other is engaged in communication, the rules may provide that the second device communicate to the server to direct an incoming call into voicemail instead of initiating a ring tone in the second device. In this manner, the user may avoid being disturbed by a ringing second cellular telephone while engaged in a call on the first telephone.

The mobile communication devices 202 and 204 may detect the presence of the other via short range transmissions or via long range transmissions. The distance between the devices may be dependent upon the type of proximity detecting. The transceivers 206 and 214 may communicate, for example, via a like protocol such as by Bluetooth, RFID and UWB in the short range. In the long range they may communicate via, for example, GSP or WAN. A detection module 222 is configured to detect the presence of a related second mobile communication device. It is understood that, the devices 202 and 204 may include more than one transceiver and may detect the presence of the other device or devices in any suitable manner.

FIG. 3 is a signal flow diagram including a first mobile communication device 302, a related mobile communication device 304 and an unrelated device 306. Devices 302 and 304 can transmit and receive via their transceivers 308 to one another at any time in the process. Therefore they may detect the presence of one another 310 and 312 and the unrelated third device 306. The unrelated third device 306 may also be able to detect their presence.

In another embodiment, for example, two or more related devices may endeavor to pass through a toll gate, or pass by a grocery store checkout, a school cafeteria cashier, or a ticketing kiosk. It is understood that the examples of vendors, services and tolls are not exhaustive and that the present discussion may apply to any suitable financial and/or non-financial situation. As described above, non-financial situations can include, for example, restricting an alarm or a service provider forwarding a call to voice-mail.

In one embodiment, that is, through a toll booth, two or more users may each be carrying a mobile communication device that is pre-authorized to pay tolls. However, when devices both are present, the rule may be that the first device is restricted from communication and/or authorizing a transaction with toll both 314 and therefore can maintain the status quo 316. Accordingly, the first mobile communication device does not automatically authorize payment. The rule may further be that when both mobile communication devices are present, the related second mobile communication device may automatically authorize payment to the toll booth 318. The related second mobile communication device 304 may then establish communication 320 with the unrelated third device 306, in this case a toll booth. The related second mobile communication device 304 may process the transaction 322. For example, a transaction authorization module (see 230, FIG. 2) can be configured to authorize a transaction with the unrelated third communication device without requiring substantially concurrent user input since the transaction may be pre-authorized. The unrelated third device 306 may process the transaction 324.

As mentioned above, the rules may include different characteristics including priorities, types of transactions, time of transactions, time between transactions, amount of transactions, when some or all of the rules can expire, time for payments, time between payments, authorized stores and vendor, actions needed such as prompts when in presence of other devices, and the dollar amount for authorization. Accordingly, in one example, the rules can include a transaction criterion including the establishment of the time of day of a proposed transaction. In another example, the rules can include a transaction criterion including the establishment of the frequency of more than one proposed transaction. In yet another example, the rules can include a transaction criterion including the establishment of the identity of another device.

As mentioned above, the rules may relate issues other than payments and/or transactions. For example, as described above, the rules may relate to which device may annunciate a ring tone, or may annunciate an alarm. The rules may be adaptive and may provide the ability for the devices to change and/or learn according to the rules. The rules may provide for prompts to the users in certain situations, or may provide for self-determination by the device in other situations, requiring no user input to the device.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the disclosure as determined by the appended claims, as may be amended during the pendency of this application for patent, and all equivalents thereof, when interpreted in accordance with the breadth to which they are fairly, legally and equitably entitled.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

The invention claimed is:

1. A method of a first mobile communication device, the method comprising:
   relating, by the first mobile communication device, the first mobile communication device to a related second mobile communication device by establishing at least one rule between the first mobile communication device and the related second mobile communication device based on their proximity to each other;
   detecting, by the first mobile communication device, a presence of the related second mobile communication device; and
   authorizing, by the first mobile communication device, a communication with a third entity based on the at least one rule regarding the presence of the related second mobile communication device, wherein the at least one rule includes at least one of a priority of a transaction, a type of the transaction, a time of the transaction, a time between a plurality of transactions, an amount of the transaction, and an information on when the at least one rule can expire, wherein the authorizing communication with the third entity is implemented by the first communication device.

2. The method of claim 1, further comprising:
   establishing, by the first mobile communication device, the at least one rule with the related second mobile communication device restricting wireless communication between the related second mobile communication device and the third entity based on the presence of the first mobile communication device with the related second mobile communication device.

3. The method of claim 1, wherein detecting, by the first mobile communication device, a presence of a related second mobile communication device comprises:
   receiving, by the first mobile communication device, a short range communication signal transmitted by the related second mobile communication device.

4. The method of claim 1, wherein detecting, by the first mobile communication device, a presence of a related second mobile communication device comprises:
   receiving, by the first mobile communication device, a communication signal via a wireless wide area network transmitted by the related second mobile communication device.

5. The method of claim 1, further comprising:
   processing, by the first mobile communication device, the transaction with the third entity.

6. The method of claim 1, further comprising:
   restricting, by the first mobile communication device, the transaction with the third entity based upon transaction criteria.

7. The method of claim 1, wherein the communication comprises a payment transaction.

8. A method of a first mobile communication device, the method comprising:
   relating, by the first mobile communication device, the first mobile communication device to a related second mobile communication device by establishing at least one rule between the first mobile communication device and the related second mobile communication device based on their proximity to each other;
   detecting, by the first mobile communication device, a presence of the related second mobile communication device; and
   restricting, by the first mobile communication device, wireless communication with a non-related communication device based on the at least one rule regarding the presence of the related second mobile communication device, wherein the at least one rule includes at least one of a priority of a transaction, a type of the transaction, a time of the transaction, a time between a plurality of transactions, an amount of the transaction, and an information on when the at least one rule can expire, wherein the restricting wireless communication with the third entity is implemented by the first communication device.

9. The method of claim 8, further comprising:
   establishing, by the first mobile communication device, the at least one rule with the related second mobile communication device enabling wireless communication between the related second mobile communication device and the non-related communication device based on the proximity of the first mobile communication device to the second mobile communication device.

10. The method of claim 8, wherein detecting, by the first mobile communication device, a presence of a related second mobile communication device comprises:
    receiving, by the first mobile communication device, a short range communication signal transmitted by the related second mobile communication device.

11. The method of claim 8, wherein detecting, by the first mobile communication device, a presence of a related first mobile communication device comprises:
    receiving, by the first mobile communication device, a communication signal via a wireless wide area network transmitted by the related second mobile communication device.

12. A mobile communication device comprising:
    a transceiver capable of communication according to a protocol, the communication being with another transceiver operable according to a like protocol;

a controller configured to control operations of the mobile communication device and coupled to the transceiver;

a correspondence module coupled to the controller, the correspondence module configured to relate the mobile communication device to a related second mobile communication device by establishing at least one rule between the mobile communication device and the related second mobile communication device based on their proximity;

a detection module coupled to the controller, the detection module configured to detect a presence of the related second mobile communication device; and a communication authorization module coupled to the controller, the communication authorization module configured to authorize wireless communication with a non-related communication device based on the at least one rule regarding the presence of the related second mobile communication device, wherein the at least one rule includes at least one of a priority of a transaction, a type of the transaction, a time of the transaction, a time between a plurality of transactions, an amount of the transaction, and an information on when the at least one rule can expire.

13. The device of claim 12, further comprising:

a rule establishment module coupled to the controller, the rule establishment module configured to establish the at least one rule with the related second mobile communication device restricting wireless communication between the mobile communication device with the non-related communication device based on the presence of the related second mobile communication device.

14. The device of claim 12 further comprising:

a transaction authorization module coupled to the controller, the transaction authorization module configured to authorize the transaction with the non-related communication device without requiring substantially concurrent user input.

15. The device of claim 12, further comprising:

a rule establishment module coupled to the controller, the rule establishment module configured to restrict the transaction with the non-related communication device based upon a transaction criterion.

16. The device of claim 15, wherein the transaction criterion comprises:

the establishment of the time of day of a proposed transaction.

17. The device of claim 15, wherein the transaction criterion comprises:

the establishment of the frequency of more than one proposed transactions.

18. The device of claim 15, wherein the transaction criterion comprises:

the establishment of the identity of another device.

* * * * *